United States Patent
Tomita et al.

(10) Patent No.: US 6,847,776 B2
(45) Date of Patent: Jan. 25, 2005

(54) SIGNAL RECORD/PLAYBACK APPARATUS AND METHOD FEATURING INDEPENDENT RECORDING AND PLAYBACK PROCESSING

(75) Inventors: Masami Tomita, Chiba (JP); Takao Takahashi, Tokyo (JP); Masashi Ohta, Tokyo (JP); Hiroshi Kobayashi, Kanagawa (JP); Toshiya Akiba, Kanagawa (JP); Noboru Murabayashi, Saitama (JP); Toshimichi Hamada, Tokyo (JP); Taro Suito, Kanagawa (JP); Katsunari Miyata, Tokyo (JP); Koichi Chotoku, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/262,366

(22) Filed: Mar. 4, 1999

(65) Prior Publication Data

US 2003/0142956 A1 Jul. 31, 2003

(30) Foreign Application Priority Data

Mar. 6, 1998 (JP) ............................................ 10-055218

(51) Int. Cl.$^7$ ............................ H04N 5/76; H04N 5/781
(52) U.S. Cl. ............................ 386/46; 386/52; 386/125
(58) Field of Search ................................ 386/4, 52, 55, 386/64, 46, 125, 126; 345/723; H04N 5/76, 5/781, 5/783, 9/79

(56) References Cited

U.S. PATENT DOCUMENTS

| | | | | |
|---|---|---|---|---|
| 5,237,648 A | * | 8/1993 | Mills et al. ................... | 345/723 |
| 5,331,349 A | * | 7/1994 | Kim ............................ | 348/567 |
| 5,371,551 A | * | 12/1994 | Logan et al. ................. | 348/571 |
| 5,387,928 A | * | 2/1995 | Nishimura .................... | 348/70 |
| 5,701,383 A | * | 12/1997 | Russo et al. .................. | 360/63 |
| 5,710,954 A | * | 1/1998 | Inoue .......................... | 396/374 |
| 5,761,371 A | * | 6/1998 | Ohno et al. ................... | 386/46 |
| 5,974,220 A | * | 10/1999 | Kajimoto ...................... | 386/52 |
| 6,018,612 A | * | 1/2000 | Thomason et al. .......... | 386/125 |
| 6,169,842 B1 | * | 1/2001 | Pijnenburg et al. .......... | 386/109 |
| 6,192,183 B1 | * | 2/2001 | Taniguchi et al. ............ | 386/52 |
| 6,233,389 B1 | * | 5/2001 | Barton et al. ................. | 386/46 |
| 6,385,386 B1 | * | 5/2002 | Aotake ........................ | 386/124 |
| 6,389,223 B1 | * | 5/2002 | Aotake ........................ | 386/109 |
| 6,411,771 B1 | * | 6/2002 | Aotake ........................ | 348/700 |

FOREIGN PATENT DOCUMENTS

WO  PCT WO 96/33579    * 10/1996

* cited by examiner

*Primary Examiner*—Thai Tran
(74) *Attorney, Agent, or Firm*—Frommer Lawrence & Haug LLP; William S. Frommer; Bruno Polito (57) ABSTRACT

In a signal record/playback apparatus and its method which performs the recording for recording a signal on the recording medium DISK and the playback for playing back the recorded signal from the recording medium DISK at the same time, the recording position and the playback position are set independently and arbitrarily. Record starting position information $P_{REC}$ on the recording medium DISK for starting the recording is stored, playback starting position information $P_{PB}$ on the recording medium DISK for starting the playback is stored, and the recording based on the record starting position information $P_{REC}$ and the playback based on the playback starting position information $P_{PB}$ are independently performed, so as to realize a signal record/playback apparatus and its method which can set the record starting position $P_{REC}$ and the playback starting position $P_{PB}$ arbitrarily.

26 Claims, 6 Drawing Sheets

SIGNAL RECORD/PLAYBACK APPARATUS AND METHOD FEATURING INDEPENDENT RECORDING AND PLAYBACK PROCESSING

BACKGROUND OF THER INVENTION

1. Field of the Invention

This invention relates to a signal record/playback apparatus and its method which records and plays back a video/audio signal.

2. Description of the Related Art

In a record/playback apparatus for recording, for example, a video/audio signal in a recording medium and for playing back the recorded video/audio signal, a record processing which records information such as a desired video/audio signal in a recording medium, and a playback processing which plays back the information, which has been recorded in the recording medium, are performed independently.

While information such as an image and sound which has been recorded in a recording medium is played back, if it is possible to record new information such as an image and sound in an arbitrary position at the same time, the usability for users will be improved.

SUMMARY OF THE INVENTION

In view of the foregoing, an object of this invention is to provide a signal record/playback apparatus and its method which can arbitrarily and independently set a recording position and a playback position.

The foregoing object and other objects of the invention have been achieved by the provision of a signal record/playback apparatus and its method, in which record starting position information on a recording medium where a record processing is started is stored, playback starting position information on a recording medium where a playback processing is started is stored, and the record processing based on the record starting position information and the playback processing based on the playback starting position information are independently started, so that the record starting position and the playback starting position can be set arbitrarily.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
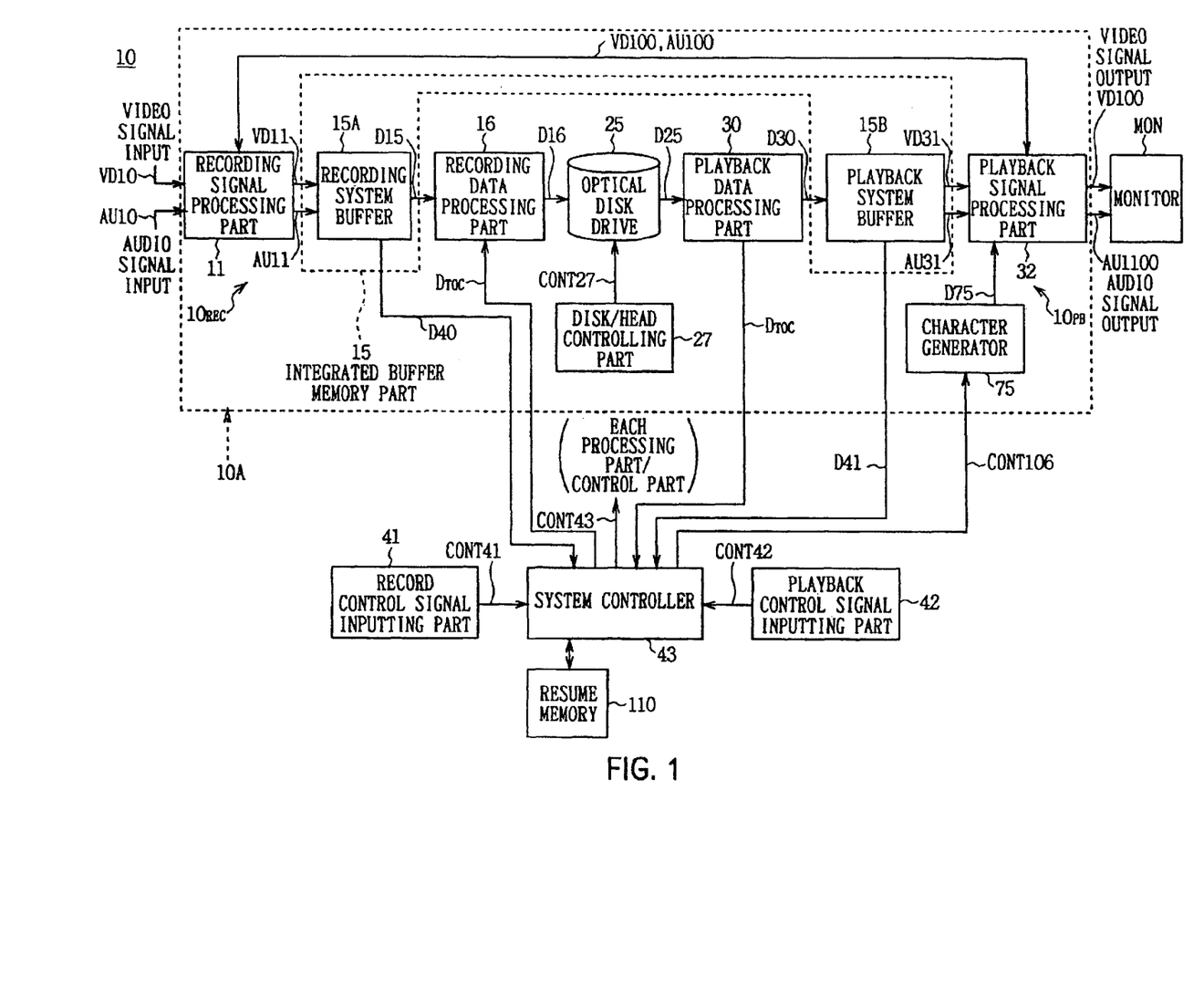
FIG. 1 is a block diagram showing the whole constitution of a video/audio signal record/playback apparatus according to the present invention.

Preferred embodiments of this invention will be described with reference to the accompanying drawings:

In FIG. 1, 10 shows a video/audio signal record/playback apparatus as a whole. When an user operates a record control signal inputting part 41 to specify a recording operation, the record command is supplied to a system controller 43 as a record control signal CONT41 through the record control signal inputting part 41. The system controller 43 outputs a control signal CONT43 to each processing part and a control part based on the record control signal CONT41, so that the video/audio signal record/playback apparatus performs a recording operation.

At this time, the video/audio signal record/playback apparatus 10 inputs to a recording signal processing part 11 an input video signal VD10 and an input audio signal AU10 which are input from the exterior to a recording system $10_{REC}$. The recording signal processing part 11 performs a band compressive processing based on the motion picture expert group (MPEG) standard on the input video signal VD10, and performs a band compressive processing such as the MPEG Audio and the Dolby AC-3 on the input audio signal AU10. The recording signal processing part 11 then inputs the resultant compressive video data VD11 and the resultant compressive audio data AU11 to a recording system buffer 15A.

The recording system buffer 15A constitutes an integrated buffer memory part 15 with a playback system buffer 15B described later. If necessary, the assignment of area can be changed in the recording system buffer 15A and the playback system buffer 15B.

While time-adjusting the compressive video data VD11 and the compressive audio data AU11, the recording system buffer 15A multiplexes the compressive video data VD11 and the compressive audio data AU11 based on the control signal CONT43 supplied from the system controller 43 to generate a program stream and a transport stream which are prescribed by the MPEG standard. These streams are supplied to a recording data processing part 16 as recording buffer output data D15. Here, header information such as time information and stream information supplied from the system controller 43 is added to the multiplexed stream.

Further, at this time, the recording system buffer 15A controls the relation between the supplied amount of the compressive video data VD11 and the compressive audio data AU11, which are supplied from the recording signal processing part 11, and the data size of the stream to be output to the recording data processing part 16, so as to avoid the overflow and underflow of the stored data.

The recording data processing part 16 performs such modulation processes as a data rearrangement, an addition of error correction code, and the eight to fourteen modulation (EMF) in accordance with the recording format, on the recording buffer output data D15 output from the recording system buffer 15A. The recording data processing part 16 then records it in an optical disk loaded in an optical disk drive 25 as recording data D16. In this case, the system controller 43 decides the amount of data to be read from the recording system buffer 15A and the recording position (address) on the optical disk for the read data, based on recording data information D40 representing the data size stored in the recording system buffer 15A.

Thus, the optical disk is controlled, e.g., servo-controlled and head-moved, with a control signal CONT27 supplied from a disk/head controlling part 27. The recording data D16 is recorded in a predetermined address area which is assigned for each video frame (30 frames/sec.) under the control of the system controller 43. At this time, the system controller 43 generates table of contents (TOC) information for each video frame of the recording data D16 and each audio data corresponding to this. The TOC information $D_{TOC}$ is output to the optical disk drive 25 through the recording data processing part 16 to record it in the TOC recording area of the optical disk. Thereby, the system controller 43 reads the TOC information, which has been recorded in the optical disk, so as to know the recording address and the time information (time code) of the recording data D16, which has been recorded in the optical disk.

On the contrary, in a playback system, when an user operates a predetermined operation part (now shown) to specify a playback operation, the playback command is output to the system controller 43 through a playback control signal inputting part 42 as a playback control signal CONT42. The system controller 43 reads out the TOC information $D_{TOC}$ from the optical disk at first, reads out the recorded data (recording data D16) from the optical disk in a frame unit successively based on the TOC information, and inputs this to a playback data processing part 30 as playback data D25.

The playback data processing part 30 performs such processes as the EFM demodulation, error correction, and data rearrangement in accordance with a predetermined playback format, on the playback data D25. The playback data processing part 30 then temporarily stores this data in the playback system buffer 15B as playback system processing data D30.

In this connection, in this embodiment, recording the recording data D16 in the optical disk and reading the playback data D25 from the optical disk are performed at the same time in the time division. The optical disk drive 25 moves the head to the recording position of the recording data D16 and the playback position of the playback data D25 in the time division, so as to perform so-called simultaneous record and playback.

The playback system buffer 15B is integrated into the same integrated buffer memory part 15 with the recording system buffer 15A. The playback system buffer 15B analyzes the header information (stream information, time information, etc.) of the stored playback system processing data D30 to separate the multiplexed data, and temporally matches the image and sound by using the time information. These data are read out at a predetermined timing as playback compressive video data VD31 and playback compressive audio data AU31, and output to a playback signal processing part 32. At this time, the playback system buffer 15B controls the relation between the amount of the playback system processing data D30 supplied from the playback data processing part 30 and the read amount of the stored playback system processing data D30, so as to avoid the overflow and underflow of the stored data.

The playback signal processing part 32 performs a band extension processing based on the MPEG standard on the playback compressive video data VD31 output from the playback system buffer 15B, and performs a band extension based on the standards such as MPEG Audio and Dolby AC-3 on the playback compressive audio data AU31. Then, the resultant playback video signal VD100 and playback audio signal AU100 are output to a monitor MON.

Thus, the video/audio record/playback apparatus 10 is provided with the recording system buffer 15A and the playback system buffer 15B, to perform at the same time in the time division the record processing in the recording system for recording the recording buffer output data D15 read out from the recording system buffer 15A in the optical disk and the playback processing in the playback system for reading the data recorded in the optical disk as the playback data D25 and storing it in the playback system buffer 15B. Thereby, the processing for recording the input video signal VD10 and input audio signal AU10 continuously input to the recording system in the optical disk and the processing for continuously playing back and outputting the playback video signal VD100 and playback audio signal AU100 from the playback system can be performed at the same time.

Further, when an user specifies an edit processing, the system controller 43 returns the necessary portion of the playback video signal VD100 and playback audio signal AU100, which are output from the playback signal processing part 32 of the playback system $10_{PB}$, to the recording signal processing part 11, and records this in the optical disk again to perform the edit processing.

In the video/audio record/playback apparatus 10, when the recording data D16 is recorded in the optical disk, the system controller 43 stores in a resume memory 110 the recording position where the recording data D16 is recorded in the optical disk.

Figure 2:
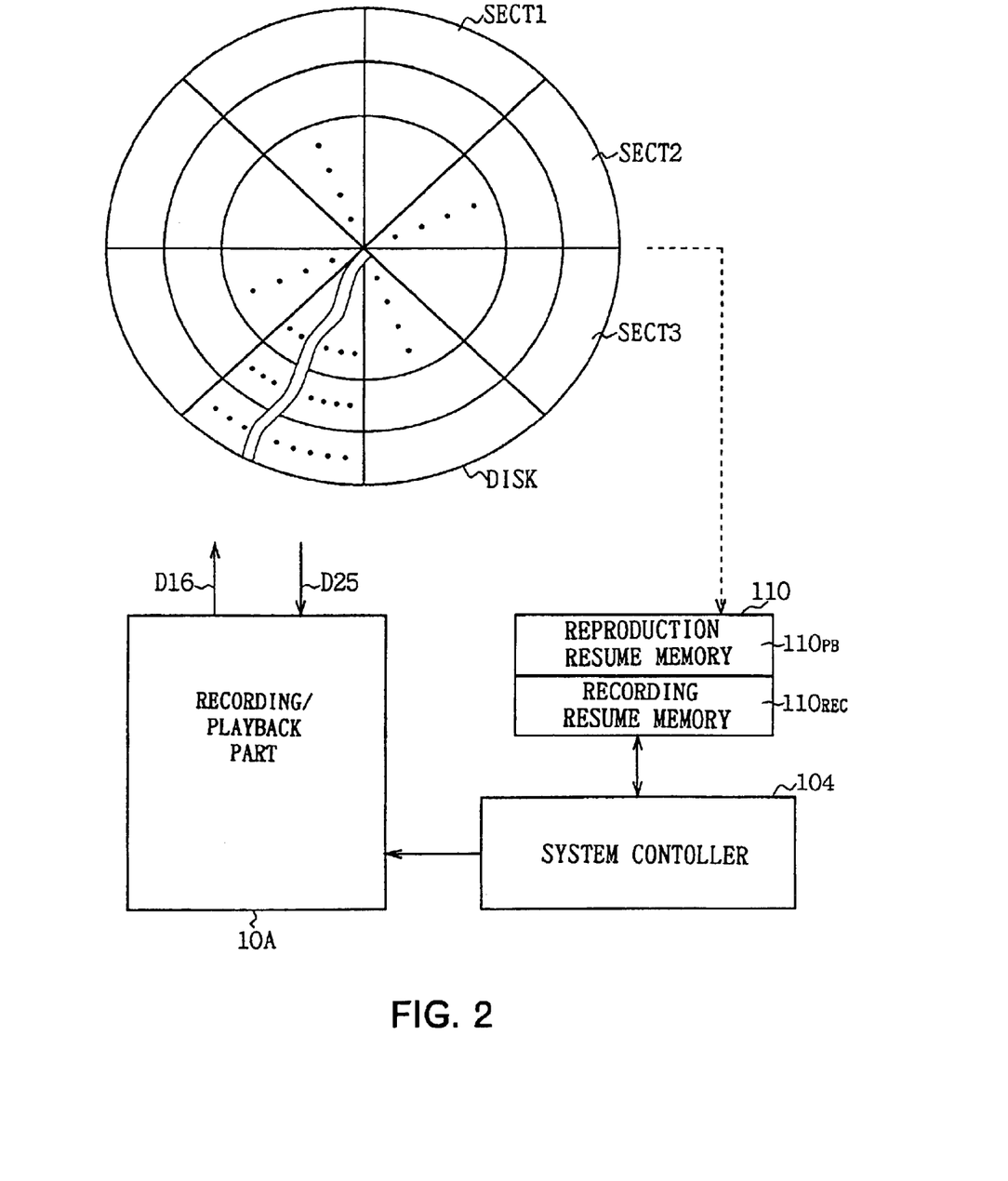
FIG. 2 is a schematic block diagram explaining the storage of the resume position according to the present invention.

More specifically, in FIG. 2 where the portions corresponding to those of FIG. 1 are designated with the same symbols, a plurality of sectors (SECTn) are provided on the optical disk as a recording unit area, and the sectors are used to specify the position (address) on the optical disk DISK by the information such as a track to be arranged and the center angle.

The system controller 43 constantly controls the sectors as a recording address, and stores the recording address of the recording data D16 newly recorded in the optical disk DISK in a recording resume memory $110_{REC}$ (record starting position storing means) of the resume memory 110.

In this way, the latest recording address is stored in the recording resume memory $110_{REC}$. When the recording is finished (or interrupted), the record stop address on the optical disk DISK has been stored in the recording resume memory $110_{REC}$. The system controller 43 thereby refers the recording resume memory $110_{REC}$ to detect the last record stop address. Based on the detected result, the recording operation can be resumed from the following recording address. The record stop address is called record starting position information.

On the contrary, based on the header information of the playback compressive video data VD31 and the playback compressive audio data AU31 which are newly read out from the playback system buffer 15B and based on the TOC information which has been read out from the optical disk, the system controller 43 determines the playback address on the optical disk for the playback compressive video data VD31 and the playback compressive audio data AU31 to store this address in the playback resume memory $110_{PB}$ (playback starting position storing means) of the resume memory 110.

Thus, the latest playback address is stored in the playback resume memory $110_{PB}$. When the playback operation is finished (or interrupted), the playback stop address on the optical disk DISK is stored in the playback resume memory $110_{PB}$. The system controller 43 thereby refers the playback resume memory $110_{PB}$ to detect the last playback stop address. Based on the detected result, the playback can be resumed from the following playback address. In this way, the playback address to be stored in the playback resume memory $110_{PB}$ is detected based on the playback compressive video data VD31 and the playback compressive audio data AU31 which are read out from the playback system buffer 15B, so as to detect, as a playback stop address, the position where an image and sound actually viewed on the monitor by an user stopped being played back. The playback stop address is called playback starting position information.

Figure 3:
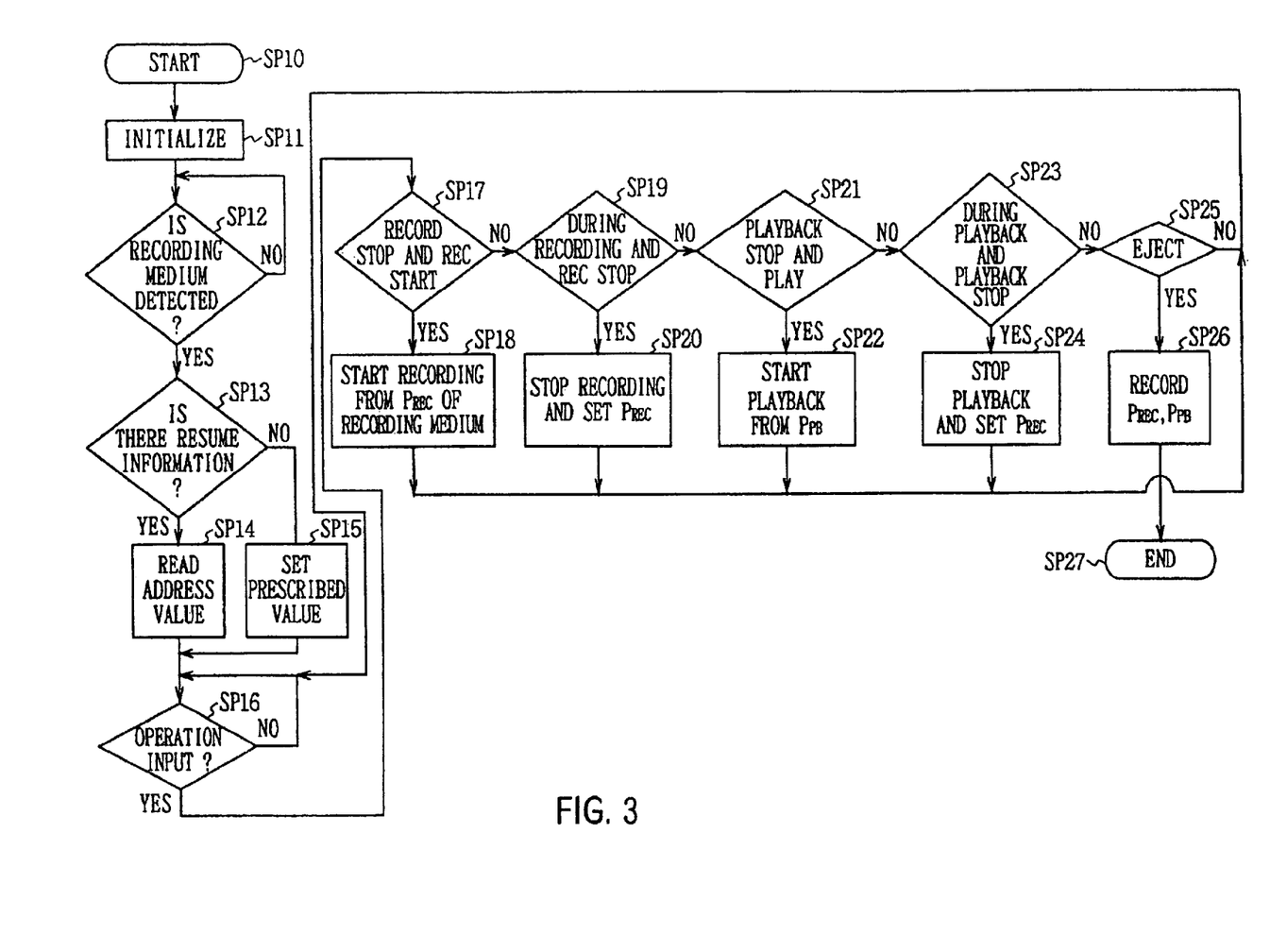
FIG. 3 is a flowchart showing the procedure of setting the record and playback stop position according to the present invention.

Here, FIG. 3 shows the procedure for setting a record/playback stop position in the video/audio signal record/playback apparatus 10. When an user drives the apparatus, the system controller 43 enters the procedure from step SP10, and at step SP11, initializes the system. Then, at following step SP12, it is judged whether or not a recording medium (optical disk) is loaded.

An affirmative result here signifies that the optical disk DISK has been loaded in the optical disk drive 25. The system controller 43 then proceeds to step SP13 to judge whether or not the resume information (the record stop address and the playback stop address described in FIG. 2) has been written in the loaded optical disk DISK.

In this connection, when the optical disk DISK is taken out from the optical disk drive 25, the resume information corresponding to the optical disk DISK is stored in a part of the optical disk DISK. The system controller 43 judges whether or not the resume information exists when the optical disk DISK is loaded.

In this connection, the resume information may be stored in a non-volatile memory (not shown in the figure) provided in the video/audio signal record/playback apparatus 10, instead of being recorded in the optical disk DISK.

An affirmative result at step SP13 signifies that the resume information has been written in the optical disk DISK. At this time, the system controller 43 proceeds to step SP14 to store the record stop address $P_{REC}$ of the resume information in the recording resume memory $110_{REC}$ of the resume memory 110, and to store the playback stop address $P_{PB}$ in the playback resume memory $110_{PB}$. Then, the system controller 43 proceeds to the next step SP16.

On the contrary, a negative result at step SP13 signifies that the resume information has not been written in the optical disk DISK. At this time, at step SP15, the system controller 43 stores, as the resume information, in the resume memory 110 the prescribed value representing, for example, the head of the optical disk which has been previously set, and proceeds to the next step SP16.

At step SP16, the system controller 43 judges whether or not the operation, such as recording, playback, or ejecting the recording medium, is input by an user. If an affirmative result is obtained here, the system controller 43 proceeds to step SP17 to judge whether or not a record starting operation key is operated during the recording is stopped.

If an affirmative result is obtained here, the system controller 43 proceeds to step SP18 to start newly recording from the address on the optical disk DISK which is determined depending on the record stop address $P_{REC}$ stored in the recording resume memory $110_{REC}$.

On the contrary, if a negative result is obtained at step SP17, the system controller 43 proceeds to step SP19 to judge whether or not a record stop operation key is operated during recording as a state that the operation is input by an user.

An affirmative result signifies that the user requests to stop the recording during recording. At this time, the system controller 43 proceeds to step SP20 to stop the recording and to set to the recording resume memory $110_{REC}$ the recording position on the optical disk DISK of the recording data D16 which was recorded at last, as a record stop address $P_{REC}$.

On the contrary, if a negative result is obtained at step SP19, the system controller 43 proceeds to step SP21 to judge whether or not a playback start operation key is operated while playback is stopped as a state that the operation is input by an user.

If an affirmative result is obtained here, the system controller 43 proceeds to step SP22 to start playing back from the address on the optical disk DISK determined depending on the playback stop address $P_{PB}$ which has been stored in the playback resume memory $110_{PB}$.

On the contrary, if a negative result is obtained at step SP21, the system controller 43 proceeds to step SP23 to judge whether or not a playback stop operation key is operated during playback as a state that the operation is input by an user.

An affirmative result here signifies that the user requests to stop the playback during playback. At this time, the system controller 43 proceeds to step SP24 to stop the playback, and to set to the playback resume memory $110_{PB}$, the playback position on the optical disk DISK for the playback data (the playback compressive video data VD31 and the playback compressive audio data AU31) which was output at last from the playback system buffer 15B, as a playback stop address $P_{PB}$.

On the contrary, if a negative result is obtained at step SP23, the system controller 43 proceeds to step SP25 to judge whether or not an operation key for taking out the optical disk DISK is operated as a state that the operation is input by an user.

If an affirmative result is obtained here, the system controller 43 proceeds to step SP26 to write in a part of the optical disk DISK the record stop address $P_{REC}$, which has been stored in the recording resume memory $110_{REC}$ of the resume memory 110, and the playback stop address $P_{PB}$, which has been stored in the playback resume memory $110_{PB}$. Then, the procedure is terminated.

On the contrary, if a negative result is obtained at step SP25, or if the above described processing in step SP18, SP20, SP22, or SP24 are terminated, the system controller 43 returns to step SP16 to repeat the same processing.

In this way, the record stop address $P_{REC}$ and the playback stop address $P_{PB}$ are stored independently in the recording resume memory $110_{REC}$ and the playback resume memory $110_{PB}$ in accordance with each operation, and are written in the optical disk DISK if necessary, so that new data can be recorded or played back from the position following the position where the last data was recorded or played back, when the recording or playback operation is resumed.

Figure 4:
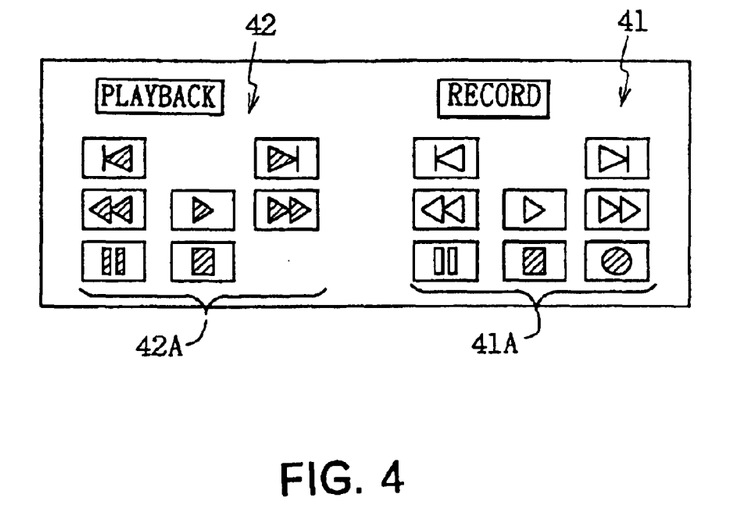
FIG. 4 is a schematic plane diagram showing the input operation part for the recording position and the playback position.

Here, as shown in FIG. 4, a record operation part 41A (the record starting position setting means) and a playback operation part 42A (playback setting means) are independently provided for recording and playback, as an operation key which is operated by an user, in the record control signal inputting part 41 and the playback control signal inputting part 42 of the video/audio signal record/playback apparatus 10.

The playback operation part 42A can be used for specifying a playback to the video/audio signal record/playback apparatus 10 which can perform the simultaneous recording and playback, independent of a recording. Various operations relating to playback such as the specification of playback position, the start of playback, the fast-forwarding playback, and the frame by frame playback, can be specified with the playback operation part 42A. The playback position on the optical disk where the data is played back in this playback is constantly updated in the playback resume memory 110$_{PB}$, On the other hand, the record operation part 41A can be used for specifying a recording to the video/audio signal record/playback apparatus 10, independent of a playback. Various operations relating to recording, such as the specification of recording position and the start of recording, can be specified with the record operation part 41A. The recording position on the optical disk where the data is recorded in this recording is constantly updated in the recording resume memory 110$_{REC}$. Thereby, the address stored in the recording resume memory 110$_{REC}$, after the recording is stopped, is the address when the recording is stopped (record stop address P$_{REC}$) However, in this embodiment, in addition to this, an user operates the record operation part 41A to arbitrarily change the record stop address P$_{REC}$ stored in the recording resume memory 110$_{REC}$. Thus, the record starting position can be set arbitrarily.

For instance, while a vide/audio signal is played back from the optical disk, the user can operate the record operation part 41A so as to move the record stop address P$_{REC}$ of the recording resume memory 110$_{REC}$. At this time, the system controller 43 outputs a control signal CONT106 (FIG. 1) to a character/generator 75 accompanying with the movement of the record stop address P$_{REC}$. The character/generator 75 outputs a character display signal D75 representing a predetermined character to the playback signal processing part 32 in accordance with the control signal CONT106, so as to synthesize the character of the character display signal D75 with the playback video signal VD100.

Figure 5:
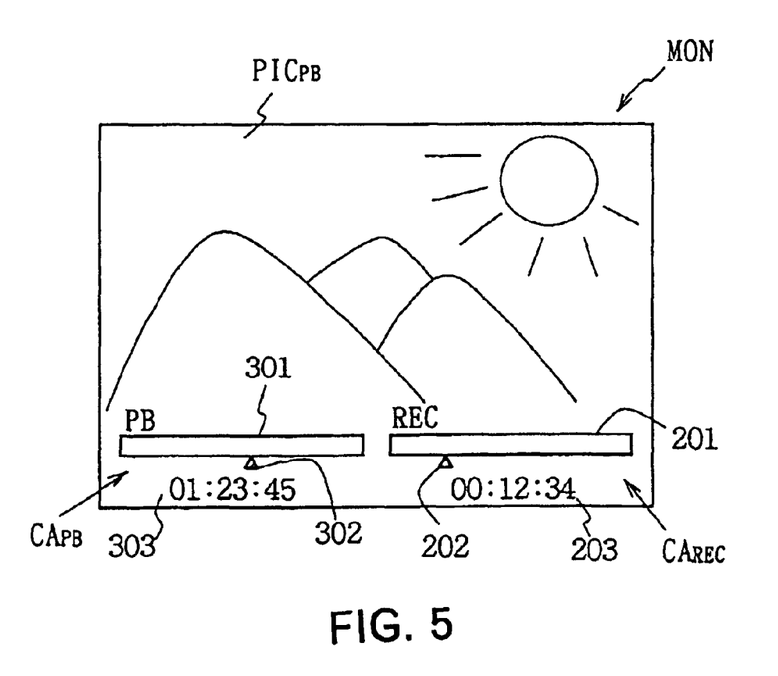
FIG. 5 is a schematic plane diagram showing the display screen on the monitor.

As a result, as shown in FIG. 5, a record character CA$_{REC}$ representing the position of the record stop address P$_{REC}$ is displayed at a part of the playback picture PIC$_{PB}$, on the monitor MON for displaying the playback video signal VD100. The record character CA$_{REC}$ uses one band character 201 to indicate the recording area of the optical disk. The position of the recording area currently stored in the recording resume memory 110$_{REC}$ as the record stop address P$_{REC}$ is indicated by a pointer 202. When the record stop address P$_{REC}$ is changed, the pointer 202 moves on the band character 201 in accordance with this change. Thereby, an user can roughly know the position of the record stop address P$_{REC}$ which is currently set. In addition to this, the position information of the set record stop address P$_{REC}$ is visibly shown by a numeral character 203 representing a time code. Thus, the user views the time code so as to correctly confirm the record stop address P$_{REC}$ which is set at this time. In this connection, the time code also changes accompanying with the change of the record stop address P$_{REC}$.

Further, in addition to the record character CA$_{REC}$ in accordance with the record stop address P$_{REC}$, the character/generator 75 also displays the playback character CA$_{PB}$ representing the playback address under playback, on the monitor MON.

The playback character CA$_{PB}$ uses one band character 301 to indicate the recording area, the same as the record character CA$_{REC}$, and has a pointer 302 which moves on the band character 301 in accordance with the playback position. Thereby, an user views the pointer 302 to roughly know the playback position on the optical disk of the playback picture PIC$_{PB}$, which is currently displayed on the monitor MON. In addition to the pointer 302, a time code which changes in accordance with the playback position is shown by a numeral character 303. Thus, the user views the numeral character 303 so as to correctly confirm the playback position of the playback picture PIC$_{PB}$ which is under playback.

In this way, in the case where the user operates the record starting operation key while only the playback is performed, the recording starts from the position specified by the record stop address P$_{REC}$ with the playback being continued. The pointer 202 and the numerical character 203 of the record character CA$_{REC}$ change in accordance with the recording operation.

On the other hand, when only the recording is performed, although the recording picture is displayed on the monitor MON, the playback position displayed as the playback character CA$_{PB}$ at this time is the last playback stop address P$_{PB}$ stored in the playback resume memory 110$_{PB}$. Thereby, when the user operates the playback operation part 42A to change the playback stop address P$_{PB}$, the pointer 302 and the numerical character 303 of the playback character CA$_{PB}$ move and change in accordance with the setting by the user. In this way, in the case where the user operates the playback starting operation key in this state, the playback starts from the position specified by the playback stop address P$_{PB}$, with the recording being continued. The playback picture PIC$_{PB}$ is displayed on the monitor MON instead of the recording picture at this time.

The record character CA$_{REC}$ representing the record stop address P$_{REC}$ is displayed on the monitor MON together with the playback picture PIC$_{PB}$ of the playback image/audio signals VD100 and AU100, so that the user can know the record stop address P$_{REC}$ with the record character CA$_{REC}$ while viewing the playback picture PIC$_{PB}$. Thereby, when the recording is started in parallel with the playback while the image and sound are played back from the optical disk DISK, the recording starts from the record stop address P$_{REC}$ represented by the record character P$_{REC}$ In the above constitution, the video/audio signal record/playback apparatus 10 can perform at the same time the recording operation for recording the input video signal VD10 and the input audio signal AU10 in the optical disk DISK which is a recording medium and the playback operation for playing back the video/audio data (recording data D16) recorded in the optical disk DISK to output it as the playback video signal VD100 and the playback audio signal AU100.

In the simultaneous recording and playback, the position where the playback is stopped (the playback stop address P$_{PB}$) is the position where the playback is resumed again after the playback is stopped. Also, the position where the recording is stopped (the record stop address P$_{REC}$) is the position where the recording is resumed again after the recording is stopped. These addresses (P$_{PB}$ and P$_{REC}$) are respectively and independently set. The playback stop address P$_{PB}$ is stored as the data independent of the recording operation. The record stop address P$_{REC}$ is stored as the data independent of the playback operation.

The playback stop address P$_{PB}$ and the record stop address P$_{REC}$ are automatically stored in the resume memory 110 when the playback is stopped and when the recording is stopped. At the same time, when the playback operation part 42A provided for playback and the record operation part 41A are operated by the user, the playback stop address P$_{PB}$ and the record stop address $P_{REC}$ are independently changed in the setting based on the operation.

In the state that the playback stop address $P_{PB}$ and the record stop address $P_{REC}$ are set, when the user operates the record operation part 41A to start the recording while only the playback is performed, the system controller 43 starts a recording operation from the record stop address $P_{REC}$ stored in the recording resume memory $110_{REC}$ with the playback being continued. Thereby, the simultaneous record and playback processing is started.

On the contrary, when the user operates the playback operation part 42A to start the playback while only the recording is performed, the system controller 43 starts a playback operation from the playback stop address $P_{PB}$ stored in the playback resume memory $110_{PB}$ with the recording being continued. Thereby, the simultaneous record and playback processing is started.

According to the construction described above, even if the playback is in progress, the user can operate the record operation part 41A to start the recording from the arbitrary position with no influence on the playback. Further, even if the recording is in progress, the user can operate the playback operation part 42A to start the playback from the arbitrary position with no influence on the recording. Therefore, the usability for the user can be improved significantly.

Figure 6:
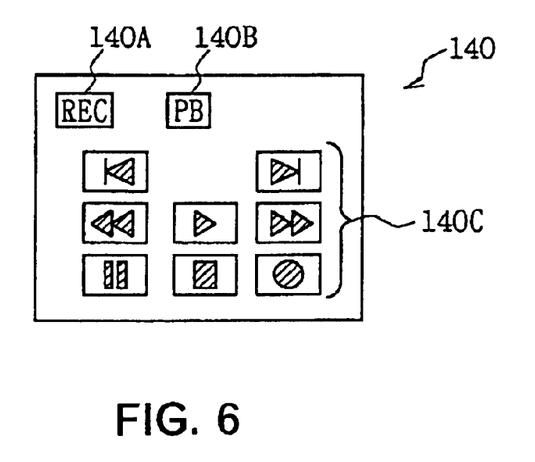
FIG. 6 is a schematic plane diagram showing the input operation part according to another embodiment.

In the above described embodiment, the playback operation part 42A and the record operation part 41A are separately provided for the playback control signal inputting part 42 and the record control signal inputting part 41. However, the present invention is not limited to this, but as shown in FIG. 6, a control signal inputting part 140 in which the playback control signal inputting part 42 and the record control signal inputting part 41 are integrated is provided, and one of an operation key for recording 140A and an operation key for playback 140B is operated so as to changeably use one set of the operation part 140C provided on the control signal inputting part 140 as an operation part for recording or playback.

Figure 7:
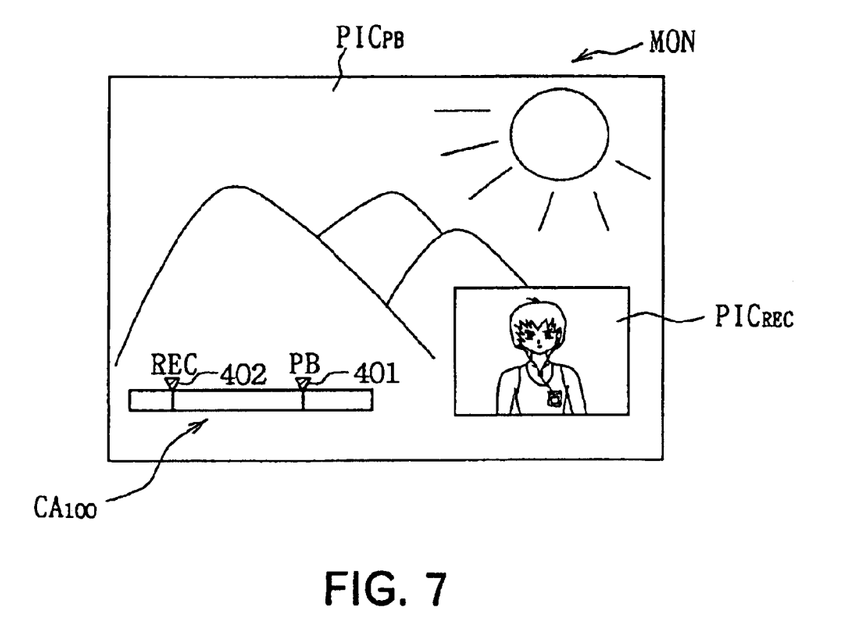
FIG. 7 is a schematic plane diagram showing the display screen of the monitor according to another embodiment.

Further, in the above embodiment described in FIG. 5, either the playback picture $PIC_{PB}$ or the recording picture is displayed on the screen of the monitor MON. However, the present invention is not limited to this, but as shown in FIG. 7, various display methods can be used such that a picture (recording picture $PIC_{REC}$) corresponding to the record stop address $P_{REC}$ is displayed at a part of the playback picture $PIC_{PB}$ which is under playback, in accordance with so-called picture-in-picture method, or such that the monitor screen is divided into two so as to display them. In this connection, the recording picture $PIC_{REC}$ displayed together with the playback picture $PIC_{PB}$ is a picture corresponding to the record stop address $P_{REC}$ stored in the recording resume memory $110_{REC}$ while the recording is stopped. On the contrary, while the recording is performed, it is a picture under recording.

Further, in the above embodiment described in FIG. 5, the playback character $CA_{PB}$ and the record character $CA_{REC}$ are displayed respectively with the independent display characters. However, the present invention is not limited to this, but as shown in FIG. 7, a record and playback character $CA_{100}$ in which characters for playback and recording are integrated is displayed and a pointer for playback 401 and a pointer for recording 402 are simultaneously displayed on the record and playback character $CA_{100}$, so that the user can easily know the relative position.

Further, in the above embodiment described in FIG. 5, under the condition that the playback picture $PIC_{PB}$ or the recording picture $PIC_{REC}$ is display on the whole screen of the monitor MON, the record character $CA_{REC}$ and the playback character $CA_{PB}$ are displayed thereon, so as to visibly display the record stop address $P_{REC}$ and the playback stop address $P_{PB}$ (note that the record stop address $P_{REC}$ and the playback stop address $P_{PB}$ represent respectively the current recording position and playback position during recording and playback). However, the present invention is not limited to this, but when the record stop address $P_{REC}$ is moved by the user for example, the recording picture $PIC_{REC}$ of the record stop address $P_{REC}$ can be displayed temporarily instead of the playback picture $PIC_{PB}$ being displayed on the display screen of the monitor MON. In this case, while the recording picture $PIC_{REC}$ of the record stop address $P_{REC}$ set by the user is displayed on the display screen of the monitor MON, the playback can be stopped so as to store in the playback resume memory $110_{PB}$ the playback stop address $P_{PB}$ which is stopped. Thus, after the record stop address $P_{REC}$ is set, the playback can be resumed again from the position where the playback is stopped when the playback picture is returned on the display screen of the monitor MON.

Further, in the above described embodiment, the playback character $CA_{PB}$ and the record character $CA_{REC}$ are displayed on the screen of the monitor MON together with the playback picture $PIC_{PB}$ and/or the recording picture $PIC_{REC}$. However, the present invention is not limited to this, but a liquid crystal panel can be used to display the playback character $CA_{PB}$ and the record character $CA_{REC}$ on a part of the operation part to be operated by the user.

Figure 8:
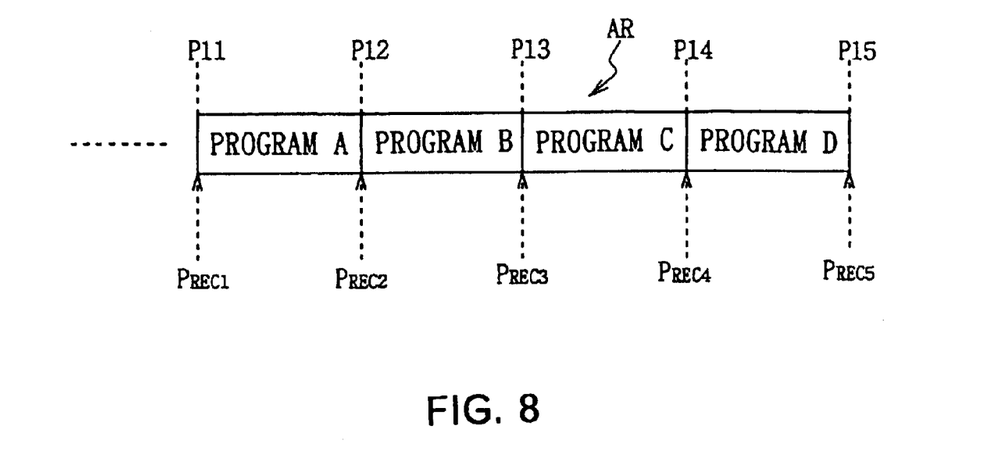
FIG. 8 is a schematic diagram explaining the setting of a plurality of record stop addresses.

Further, in the above described embodiment, the position where the recording is stopped last time or the position arbitrarily set by the user is assigned as the record stop address $P_{REC}$. However, the present invention is not limited to this, but as shown in FIG. 8, a plurality of the record stop addresses $P_{REC1}$, $P_{REC2}$, $P_{REC3}$, $P_{REC4}$, and $P_{REC5}$, of the recording data D16 in the area where the recording data 16 has been already recorded in one recording area AR provided on the optical disk DISK are stored in the recording resume memory $110_{REC}$, and the user can select a desired record stop address from among the plural addresses.

Thereby, since the probability that the record stop address is the border of a program is generally high, next recording can be easily started from the position where the program is finished. Also, in this case, the record stop address arbitrarily set by the user can be added as a plurality of record stop addresses stored in the recording resume memory $110_{REC}$.

In the case where the plural addresses are stored in the resume memory 110 in this way, the system controller 43 successively reads out the stored address whenever the user operates the operation part, and successively changes addresses to display them visibly. As the method of displaying visibly, the record character $CA_{REC}$ (FIG. 5) can be successively displayed or the recording picture $PIC_{REC}$ corresponding to the address successively changed can be successively changed to be displayed. In this case, the system controller 43 accesses the optical disk based on the address stored in the resume memory 110.

Moreover, when a plurality of record stop addresses $P_{REC}$ and the playback stop addresses $P_{PB}$ are stored in the resume memory 110, the system controller 43 displays a list of a plurality of addresses on the display screen of the monitor MON in accordance with the user's demand, so that the user can easily know the setting state of the record stop address $P_{REC}$ and the playback stop address $P_{PB}$ with these displays.

Further, in the above described embodiment, the record stop address $P_{REC}$ and the playback stop address $P_{PB}$ respectively stored in the recording resume memory $110_{REC}$ and the playback resume memory $110_{PB}$ are independently controlled by the system controller 43. However, the present invention is not limited to this, but under the control of the system controller 43, data can be transferred if necessary, such like that the record stop address $P_{REC}$ and the playback stop address $P_{PB}$ are copied or moved each other.

Further, in the above described embodiment, the optical disk is used as a recording medium. However, the present invention is not limited to this, but other various recording media such as magneto-optical disk can be used.

Further, in the above described embodiment, the video/audio signal is recorded in the recording medium. However, the present invention is not limited to this, but is widely applicable to the case where other various information can be recorded and played back.

Further, in the above described embodiment, the recording and playback are resumed based on the record stop position (address) and the playback stop position (address). However, the address information to be stored in the resume memory 110 is not limited to the record stop position and the playback stop position. The record starting position (address) and the playback starting position (address) obtained based on the record stop position and the playback stop position can be stored.

As described above, according to this invention, record starting position information on a recording medium for starting the recording is stored, playback starting position information on a recording medium for starting the playback is stored, and the recording based on the record starting position information and the playback based on the playback starting position information are independently started, so as to realize a signal record/playback apparatus and its method which can set the record starting position and the playback starting position arbitrarily.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A signal record/playback apparatus for performing a record processing of recording a signal in a recording medium and a playback processing of playing back the recorded signal from said recording medium, comprising:
    a buffer memory including a first area for storing a signal to be recorded on said recording medium and a second area for storing a signal reproduced from said recording medium, said apparatus being operable to change the location of said first area and said second area;
    record starting position storing means for storing record starting position information on a start position of said record processing on said recording medium; and
    playback starting position storing means for storing playback starting position information on a start position of said playback processing on said recording medium;
    wherein said record processing based on said record starting position information and said playback processing based on said playback starting position information are independently carried out;
    whereby said signal recorded on said recording medium is a video signal and a moving picture corresponding to at least one record starting position is displayed superimposed on a played signal played back from said recording medium during said playback processing.

2. The signal record/playback apparatus according to claim 1, wherein
    said record starting position information stored in said record starting position storing means is a record stop position of said signal which has been recorded in said recording medium.

3. The signal record/playback apparatus according to claim 1, further comprising
    record starting position setting means for inputting arbitrary record starting position information to said record starting position storing means.

4. The signal record/playback apparatus according to claim 3, wherein
    said record starting position setting means comprises record starting position movement means for moving said record starting position information arbitrarily.

5. The signal record/playback apparatus according to claim 3, wherein
    said record starting position setting means is provided independent of playback setting means for input-setting said playback.

6. The signal record/playback apparatus according to claim 3, wherein
    said record starting position setting means is integrated with said playback setting means for input-setting the playback of said signal, and the setting of said record starting position information and the setting of playback are changed with a predetermined changing means.

7. The signal record/playback apparatus according to claim 1, further comprising
    display control means for visibly displaying said record starting position information.

8. The signal record/playback apparatus according to claim 7, wherein
    said display control means includes means for displaying said record starting position information as a relative position to all recording areas of said recording medium.

9. The signal record/playback apparatus according to claim 7, wherein
    said display control means includes means for displaying said record starting position information by changing it into numerals representing the position on said recording medium.

10. The signal record/playback apparatus according to claim 7, wherein:
    said signal recorded in said recording medium is a video signal; and
    said display control means includes means for displaying the image recorded at said record starting position or immediately in front of said record starting position as said record starting position information.

11. The signal record/playback apparatus according to claim 1, further comprising
    display control means for visibly displaying said record starting position information and said playback starting position information.

12. The signal record/playback apparatus according to claim 11, wherein
    said display control means includes means for respectively displaying said record starting position information and said playback starting position information as a relative position to all recording areas of said recording medium.

13. The signal record/playback apparatus according to claim 11, wherein said display control means includes means for respectively displaying said record starting position information and said playback starting position information by changing them into numerals representing their positions on said recording medium.

14. The signal record/playback apparatus according to claim 1, further comprising display control means for visibly displaying said record starting position information together with a played signal played back from said recording medium with said playback processing.

15. The signal record/playback apparatus according to claim 2, further comprising display control means for visibly displaying said recorded signal which corresponds to said record starting position information instead of a played signal played back from said recording medium with said playback processing.

16. The signal record/playback apparatus according to claim 15, further comprising said display control means temporarily stops the playback processing of said played signal while said recorded signal which corresponds to said record starting position information is visibly displayed instead of said played signal.

17. The signal record/playback apparatus according to claim 1, wherein:

said record starting position storing means includes means for storing a plurality of said record starting position information; and said playback starting position storing means includes means for storing a plurality of said playback starting position information.

18. The signal record/playback apparatus according to claim 17, further comprising display control means for displaying lists of said plurality of record starting position information and said plurality of playback starting position information.

19. The signal record/playback apparatus according to claim 1, further comprising signal transferring means for transferring and storing said record starting position information stored in said record starting position storing means and said playback starting position information each other.

20. A signal record/playback method of performing a record processing of recording a signal in a recording medium and a playback processing of playing back the recorded signal from said recording medium, comprising the steps of:

storing a signal to be recorded on said recording medium in a first area of a buffer memory and storing a signal reproduced from said recording medium in a second area of said buffer memory, the location of said first area and said second area being readily changeable;

storing record starting position information on a start position of said record processing on said recording medium; and storing playback starting position information on a start position of said playback processing on said recording medium;

wherein said record processing based on said record starting position information and said playback processing based on said playback starting position information are independently carried out;

whereby said signal recorded on said recording medium is a video signal and a moving picture corresponding to at least one record starting position is displayed superimposed on a played signal played back from said recording medium during said playback processing.

21. The signal record/playback method according to claim 20, wherein said step of storing said record starting position information includes a step of storing the record stop position of said signal which has been recorded in said recording medium.

22. The signal record/playback method according to claim 20, further comprising a step of controlling so that said record starting position information stored is visibly displayed together with the played signal which is played back from said recording medium with said playback processing.

23. The signal record/playback method according to claim 20, wherein said step of storing said record starting position information and said playback starting position information includes a step of storing a plurality of record starting position information and a plurality of playback starting position.

24. The signal record/playback method according to claim 23, further comprising a step of controlling so as to display lists of said plurality of record starting position information and said plurality of playback starting position information to be stored.

25. The signal record/playback method according to claim 21, further comprising a step of controlling so that said recorded signal which corresponds to said record starting position information is visibly displayed instead of the played signal which has been played back from said recording medium by said playback processing.

26. The signal record/playback method according to claim 25, further comprising a step of temporarily stopping the playback processing of said played signal while said record starting position information is visibly displayed instead of said played signal.

* * * * *